March 31, 1964  J. P. FLYNN ET AL  3,127,041
VEHICLE LOAD BED
Filed Dec. 27, 1960  2 Sheets-Sheet 1
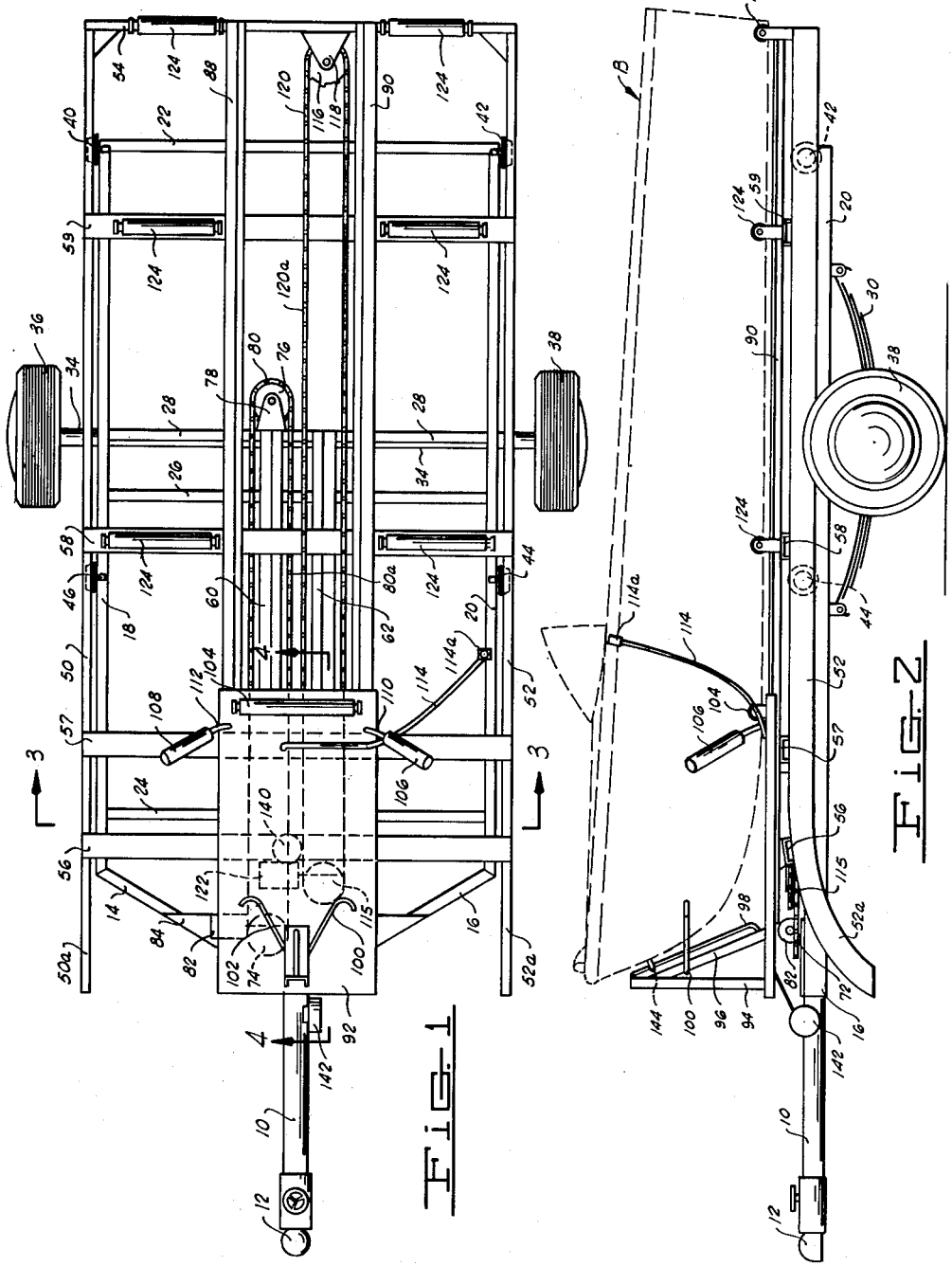
INVENTORS
JAMES P. FLYNN &
JIM D. NELSON
BY
Dunlap, Laney & Hubbard
ATTORNEYS March 31, 1964  J. P. FLYNN ET AL  3,127,041
VEHICLE LOAD BED Filed Dec. 27, 1960  2 Sheets-Sheet 2

INVENTORS
JAMES P. FLYNN &
JIM D. NELSON
BY
Dunlap, Laney & Hubbard
ATTORNEYS

United States Patent Office 3,127,041
Patented Mar. 31, 1964

3,127,041
VEHICLE LOAD BED
James P. Flynn, Rte. 1, Box 434, and Jim D. Nelson, 2600 NW. 14th, both of Oklahoma City, Okla.
Filed Dec. 27, 1960, Ser. No. 78,606
13 Claims. (Cl. 214—505)

The present invention relates to vehicle load-carrying beds of general utility which extend rearwardly from the vehicle and tip downwardly to facilitate loading and unloading thereof, and in particular, but not by way of limitation, relates to such a device specially adapted for transporting, launching and retrieving a boat.

In recent times it has become increasingly common to load one vehicle onto another to transport it overland. For example, a farmer may haul a tractor or other farm implement by truck over a highway to a field, unload the tractor to cultivate or harvest the field, then load the tractor back onto the truck and return it by the highway when the job is completed. Similarly, a sportsman may transport a boat by trailer overland from his home to a lake, launch the boat into the lake for his pleasure, then retrieve or reload the boat onto the trailer for the return trip home. In each case it would be desirable if the vehicle being loaded, such as a tractor or boat, could be driven or otherwise propelled directly from the ground or water onto the load-carrying bed of the transporting vehicle.

Several load-carrying devices for vehicles which extend rearwardly of the vehicle and tip downwardly to engage the ground to facilitate loading of another vehicle have been designed. However, these devices have proven generally impractical and unsatisfactory for various reasons. These devices are particularly unsatisfactory for handling a heavy, bulky and relatively fragile load, such as a boat, because during some part of the tipping motion the bed usually falls freely, either to the tipped position or back to the level position. Obviously, a heavy load falling freely would likely damage either the load or the tipping bed. In any event it is desirable to be able to stop the bed in any desired position and degree of tip as the circumstances may require.

The rapid rise in popularity of the outboard motor boat has resulted in widespread use of trailers pulled by automobile to transport the boats overland to available bodies of water. More often than not, the boats are launched and retrieved at a place where no special launching facilities are available. In such cases the trailer is customarily backed into the edge of the water until the boat will slide, by gravity and physical urging, down the inclined trailer into the water. Frequently the trailer cannot be backed far enough into the water to properly float the boat because of the contour of the terrain or because the soil is wet and soft and there is danger of sticking the trailer and automobile in the mire. Almost always it is necessary for the person launching the boat to wade into the water to assist in the launching operation and to push the boat to deeper water where the propulsion engine can be safely started. The same inconvenience occurs when it is desired to load the boat. The boat driver or another person usually must wade in the water to connect the loading winch to the boat, and then must manipulate the boat until it is properly aligned with the loading ramp of the trailer so that the winch can pull the boat onto the trailer.

In accordance with the present invention, two bearing means are supported on the chassis of a vehicle and are spaced one from the other. The load-carrying bed is provided with elongated track means which are adapted to ride on the bearing means as the bed is moved longitudinally or extended rearwardly of the vehicle. A portion of the track means adjacent the front end is curved downwardly. A suitable mechanical means is provided to move the bed rearwardly from the normal transporting position. As the bed is moved rearwardly, the curved portion of the track engages the bearing means and tips the rear end of the bed downwardly. When the bed is moved back forwardly, it also returns to the normal or level position as the curved portion of the track means is disengaged from the bearing means.

Therefore, it is the object of the present invention to provide an improved load-carrying bed of general application which will extend rearwardly and tip downwardly to facilitate loading and unloading.

Another object of the present invention is to provide a rearwardly extending and downwardly tipping load bed which has a positive and controlled motion throughout its travel.

Another object of the present invention is to provide a rearwardly extending and downwardly tipping load-carrying bed requiring a minimum of motive power for the extending and tipping operation.

Another object of the present invention is to provide an inexpensive mechanical device for transmitting motive power to extend and tip a load-carrying bed of the type described.

Another object of the present invention it to provide a rearwardly extending and downwardly tipping load bed which can be stopped at any position of travel regardless of the center of gravity of the load bed and the load carried thereon.

Another object of the present invention is to provide a rearwardly extending and downwardly tipping load bed which can be tipped downwardly a considerable distance, yet is under positive control at all times.

Another object of the present invention is to provide a device for transporting, launching and retrieving a boat requiring a minimum in physical exertion and providing a maximum of convenience.

Still another object of the present invention is to provide a device for launching and retrieving a boat which is substantially automatic, fully powered and within the control and command of a person sitting in the boat being launched or retrieved.

Still another object of the present invention is to provide a device for transporting, launching and retrieving a boat having the advantages heretofore mentioned which is relatively lightweight, inexpensive to manufacture and economical of operation.

Additional objects and advantages will become apparent from the following detailed description and drawings constituting a part thereof, wherein:

FIGURE 1 is a top view of a device constructed in accordance with the present invention particularly adapted to transport, launch and retrieve a boat.

FIGURE 2 is a side elevation of the device of FIG. 1 showing a boat in transport position in dotted outline.

Figure 3:
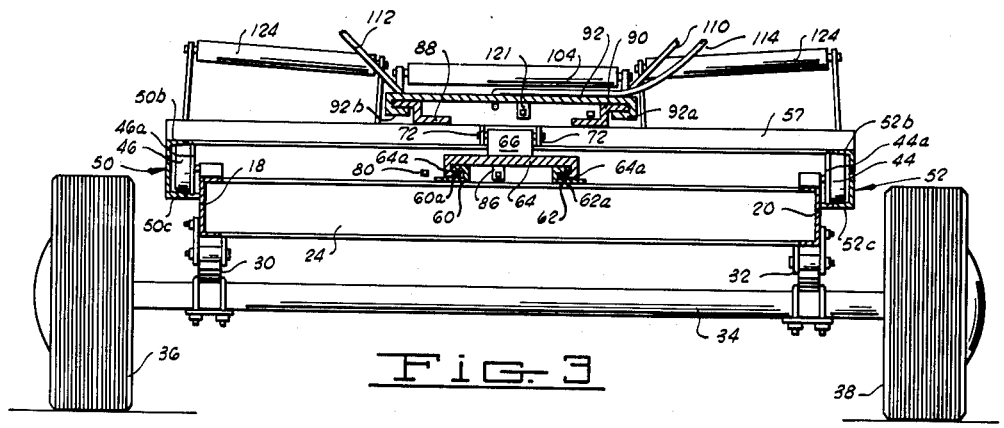
FIGURE 3 is a sectional view taken on lines 3—3 of FIG. 1.

Referring now to FIGS. 1–4, the chassis of a conventional type trailer normally pulled by an automobile or other suitable vehicle is comprised of a tongue 10 with a suitable hitch 12 for connecting the trailer to the pulling vehicle. The tongue 10 is attached to a chassis frame comprised of channel members 14 and 16 at the front, longitudinal channel members 18 and 20 along the sides, and channel member 22 at the rear. These channel members are welded or otherwise securely fastened together and braced by transverse channel members 24, 26 and 28. The chassis frame is suitably supported in some manner such as by leaf spring units 30 and 32 (see FIG. 3) on an axle 34 interconnecting road wheels 36 and 38. Four rollers 40, 42, 44 and 46 (see FIG. 1) are journaled on stub axles supported by the chassis frame. The rollers (see FIG. 3) are preferably of the type having a flange or shoulder 44a and 46a.

A load-carrying frame is generally outlined by longitudinal side channel members 50 and 52, rear end channel member 54 and front channel member 56. The longitudinal channel members 50 and 52 are interconnected by transverse bracing channel members 57, 58 and 59. The load-carrying frame rides on and is, in the present embodiment, supported by the four rollers 40, 42, 44 and 46. The longitudinal channel members 50 and 52 each have downwardly curved portions 50a and 52a, respectively, adjacent the front ends thereof.

As can best be seen in FIG. 3, each of the four rollers is contained between the upper flanges 50b and 52b and the lower flanges 50c and 52c of the longitudinal channel members 50 and 52, respectively. The upper and lower flanges of the longitudinal channel members are sufficiently spaced apart that only one flange can contact a particular roller at one time, permitting the rollers to roll and preventing binding. The lower faces of the upper flanges 50b and 52b constitute downwardly facing load-bearing surfaces which are adapted to roll on the bearing means 40, 42, 44 and 46 to permit the channel members and frame associated therewith to ride longitudinally of the chassis on the rollers. The lower flanges 50c and 52c constitute upwardly facing load-bearing surfaces which alternatively engage the bearing rollers should the load-carrying frame and channel members 50 and 52 tend to rise upwardly due to the location of the center of gravity of the load-carrying frame and the load carried thereby.

A track (see FIG. 3) comprised of rails 60 and 62 is carried by the chassis frame and extends longitudinally thereof. A shuttle member 64 slidably rides on the two track rails 60 and 62 and has inturned flange portions 64a at each edge which engage flange portions 60a and 62a of the rails to prevent the shuttle member from leaving the track due to upwardly directed force components. An elongated member 66 (FIG. 4) is pivotally connected at one end to the shuttle member 64 by pin 68 and the other end is pivotally connected by pin 70 to brackets 72 which, in turn, are secured to transverse bracing channel member 57 of the load-carrying frame.

A power sprocket 74 is journaled in suitable brackets (not shown) which are supported by the trailer chassis frame at a point adjacent one end, preferably the forward end, of the track rails 60 and 62. An idler sprocket 76 (FIG. 1) is journaled in brackets 78 connected to transverse bracing channel member 28 of the chassis frame. A chain 80 passes around and is suitably engaged by the teeth on the sprockets 74 and 76. An electric motor 82 is mounted on a plate 84 on the trailer chassis and drives the drive sprocket 74 by some suitable means such as a worm gear (not shown). One reach 80a of the chain 80 is connected to the shuttle member 64 by a suitable bracket 86 (FIG. 3). The electric motor 82 is preferably of a type which can be driven in either direction of rotation and preferably has a magnetically releasable brake which engages to hold the motor shaft whenever the motor is de-energized.

A launching track extends longitudinally of the load-carrying frame and comprises rails 88 and 90 which are supported on the various transverse members of the load-carrying frame. The rails 88 and 90 preferably have a cross-sectional configuration such as shown in FIG. 3.

A launching cradle travels on the launching track longitudinally of the load-carrying bed and is comprised of a plate 92 having downwardly spaced and inturned flanges 92a and 92b which engage rails 88 and 90, respectively, to prevent the plate 92 from leaving the rails. Upstanding channel members 94 and 96 (FIG. 2) are supported on the forward end of the plate 92, and a rod 98 is suitably connected to the channel members and spaced therefrom. A V-shaped spring guide (FIG. 1) is connected to the channel 96 and is comprised of arms 100 and 102 which extend rearwardly and outwardly from the channel 96. A support roller 104 is journaled in suitable brackets connected to the rear end portion of the plate 92. Guide rollers 106 and 108 are journaled on stub axles 110 and 112, respectively, which are also connected to the plate 92. A control pedestal comprised of a suitable tubular electrical wiring conduit 114 is also connected to the cradle plate 92 and has a control box 114a with controls for the electric motors, as will hereafter be described in detail.

The cradle is propelled along the launching track by a chain and sprocket arrangement similar to that previously described for moving the shuttle member 64. A power sprocket 115 (FIGS. 1 and 2) is journaled in brackets attached to transverse channel member 56 of the load-carrying frame. An idler sprocket 116 is journaled on brackets 118 which are connected to rear end member 54 of the load-carrying frame. An endless chain 120 is carried by the sprockets. One reach 120a of the chain 120 is connected by a bracket 121 (see FIG. 3) to the cradle plate 92. A suitable motor 122 is also mounted on transverse channel member 56 and drives the drive sprocket 115 by a worm gear or other suitable arrangement. Motor 122, like motor 82, can be driven in either direction and preferably has a magnetically releasable brake which engages the motor shaft to prevent rotation thereof whenever the motor is de-energized.

Suitable elongated rollers 124 are placed in appropriate positions on the load-carrying frame to receive and support a boat B shown in normal transporting position by dotted outline in FIG. 2. The number and placement of the rollers 124, the location of rollers 106 and 108, the placement of the V-shaped guide 100, and the overall dimensions of the load-carrying bed and cradle must be adapted to the particular boat to be transported.

It is contemplated by the present invention that the controls 114a for the electric motors 82 and 122 be supported by the pedestal 114 within easy reach of a person sitting within boat B while it is being launched or retrieved by the trailer. The pedestal 114 is rigidly secured to the boat cradle plate 92 which moves relative to the load-carrying frame which supports the motor 122. Therefore, a spring-loaded, automatic-rewind drum 140 (FIG. 1) is suitably supported adjacent the motor 122 on the load-carrying frame and serves to control slack in the electric control cables necessary between the boat cradle and the load-carrying bed for both motors 82 and 122. Since the load bed moves relative to the chassis, a second spring-loaded, automatic rewind drum 142 is provided to control the slack in the electric cables necessary to supply power to motor 122 and to control motor 82 by the control box 114a.

The electrical control circuits for the electric motors 82 and 122 are not shown because the details of the circuits are not within the present invention. All that is required is a source of power and forward and reverse circuits for controlling the direction of rotation of the motors. The magnetically released brakes associated with the motors are well known and preferably are of the type which are magnetically disengaged when the motor is energized and automatically re-engaged by spring means when the motor is de-energized. The electrical power for operating the motors can conveniently be taken from the power circuit of the vehicle which pulls the trailer.

*Operation*

Figure 5:
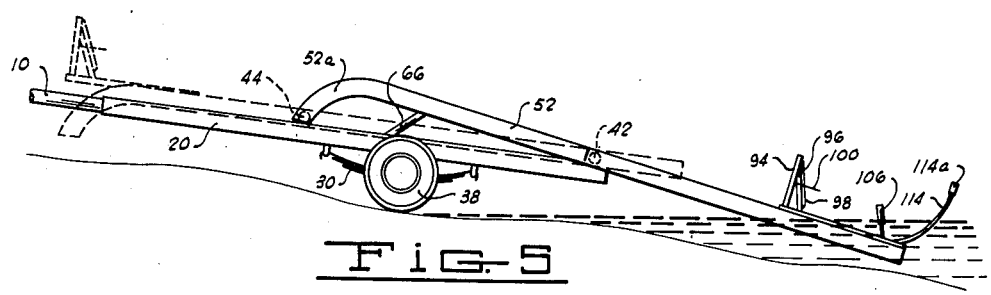
FIGURE 5 is a schematic side elevation of a device like that shown in FIG. 1 illustrating, in solid line, the load-carrying bed in extended and tipped position, and illustrating the transport position of the load bed in dotted outline.
Figure 4:
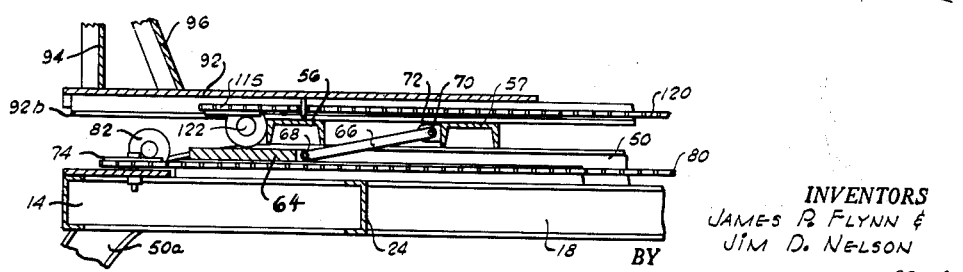
FIGURE 4 is a sectional view taken on lines 4—4 of FIG. 1.

The load-carrying frame is extended rearwardly and tipped downwardly to the extended position shown by solid lines in FIG. 5 by energization of electric motor 82 in a manner to rotate the drive sprocket 74 counter-clockwise, when referring to FIG. 1, and thereby drive the reach 80a of the chain 80 toward the rear of the trailer chassis. Since the chain reach 80a is connected by bracket 86 to the shuttle member 64, the shuttle member 64 is moved along the rails 60 and 62 toward the rear of the chassis. Elongated arm member 66 transmits the motion of shuttle member 64 to the load-carrying frame, and the load-carrying frame is moved rearwardly with the channel members 50 and 52 riding on the rollers 40, 42, 44 and 46. As the curved portions 50a and 52a of the channel members encounter the forward bearing rollers 44 and 46, the front end of the load-carrying frame is kicked upwardly and the rear end of the frame tips downwardly as the frame pivots about the rollers 40 and 42. The pivoted connections at each end of the elongated arm member 66 permit the arm 66 to continue to transmit motive force to the load-carrying frame as the front end of the frame rises from the chassis and rails 60 and 62.

Should the combined center of gravity of the load-carrying frame and the load carried thereby pass behind the rollers 40 and 42, the front end of the load-carrying frame will have a tendency to move upwardly. In such a case, the upwardly facing flanges 50c and 52c will then engage the forward rollers 44 and 46 and maintain the movement of the load-carrying frame under positive control as the frame continues to move rearwardly and tip downwardly. Therefore, it will be seen that the degree of tip and the extent of rearward extension is under positive control so long as the rollers 44 and 46 are retained between the upper and lower flanges of the channel members 50 and 52. In this regard, it may be desirable to put stops to limit the rearward travel of the load-carrying frame at a point where the rollers 44 and 46 will be retained within the channel members. Stops could easily be placed in the channel members to engage either the rear rollers 40 and 42 or the forward rollers 44 and 46, or could be related to the travel of the shuttle member 64. Provision of these stop means is believed to require only mechanical skill and therefore the stops are not illustrated.

When it is desired to return the load-carrying frame to its forward or transport position, which is that shown in FIG. 2, electric motor 82 is energized in a manner to drive sprocket 74 clockwise, when referring to FIG. 1, so as to drive reach 80a of the chain toward the front of the chassis. When the load-carrying frame is in the rearwardly extended position, the combined center of gravity of the frame will normally be behind the rollers 40 and 42. As the shuttle member 64 is moved forwardly along the rails 60 and 62 by the chain 80, the weight of the load-carrying frame and its load will be transmitted by pivoted arm 66 to the shuttle 64 as tension tending to lift the shuttle 64 from the rails 60 and 62. However, the cooperation of the inturned flanges 64a and the outturned flanges 60a and 62a of the shuttle member and rails, respectively, keep the shuttle member on the tracks 60 and 62. As the load-carrying frame is pulled forwardly, the lower upwardly facing flanges 50c and 52c engage the forward rollers 44 and 46 and force the forward end of the load-carrying frame downwardly, simultaneously raising the rear end of the frame as the frame pivots about the rollers 40 and 42. Once the center of gravity of the load-carrying frame passes forward of the rollers 40 and 42, the upper flanges 50b and 52b again contact and ride on the rollers 44 and 46 until the load-carrying frame reaches its forward or transporting position shown generally in FIGS. 1 and 2.

It is evident that very little motive force is required to extend the load-carrying frame rearwardly with the channel flanges 50b and 52b riding on the four rollers. If the center of gravity of the load and load-carrying frame is well forward as the frame is extended rearwardly, the frame is lifted by contact with the curved portion of the upper flanges 50b and 52b. The force required to tilt the frame is relatively small due to the relatively slight incline of the curved portion of the channels 50 and 52. Of course, if the center of gravity is behind the rear rollers 40 and 42, the load-carrying frame will probably gravitate to its rearwardly extended and downwardly tipped position. The motor 74 in this case will serve as a dynamic brake to maintain the tipping operation under control at all times. Also, as previously mentioned, motor 74 is provided with a magnetically released brake which will stop rotation of the motor shaft and movement of the load bed when the motor is de-energized. Similarly, when the center of gravity is behind the rollers 40 and 42 and the load-carrying frame is in its rearwardly extended position, the inclined plane effect of the upwardly facing lower flanges 50c and 52c greatly reduces the force required to raise the rear end of the load-carrying frame to the horizontal transporting position.

When it is desired to launch and retrieve the boat B from the trailer device shown in FIGS. 1–5, the trailer is backed into or as close to the edge of the water as possible, as shown generally in FIG. 5. The operator of the boat then climbs into the boat while the boat is still on the trailer. The control panel 114a is then within easy reach of the operator. The control button energizing motor 82 is then pressed to actuate the motor and move the load-carrying frame rearwardly, as previously described. After the load carrying bed has been moved to the rearwardly extended and downwardly tipped position and the rear end of the bed is partially submerged in the water, motor 82 is stopped and the magnetic brake automatically re-engages to hold the load bed in position.

Next, the control button on the panel 114a is pressed which energizes motor 122 in a manner to move the boat cradle down rails 88 and 90. This positively moves the boat down the incline over the rollers 124 and into the water. When the cradle has reached its most rearward position as indicated in solid outline in FIG. 5, the boat operator releases hook 144 (FIG. 2) which disengages the rod 98 by a suitable control within the boat such as a cable, and the boat is free and ready for operation.

When it is desired to retrieve the boat and load it onto the trailer, the boat operator drives the boat between the upstanding guide rollers 106 and 108 of the cradle. The bow of the boat then passes between the arms 100 of the V-shaped guide, and the hook 144 reengages and locks on the bar 98. With the boat B in this position, the control panel 114a is again within easy reach of the boat operator. The motor 122 is again energized and the cradle moves upwardly along the rails 88 and 90 toward the front of the load-carrying frame and the boat is pulled onto the rollers 124 of the load-carrying frame. Then the motor 82 is energized and the load-carrying frame is moved to its forward, level, transporting position in the manner previously described.

It will be noted that the entire launching and retrieving operations can be controlled by a single person from within the boat. No assistance is required from a second person outside the boat. No wading in the water is required. By extending the trailer rearwardly, the boat is more likely to be placed in water sufficiently deep to float the boat and to safely start the propulsion engine of the boat. Similarly, the extended frame is more likely to reach water sufficiently deep that the boat can, under its own power, be maneuvered and driven onto the cradle to engage the hook 144 with the bar 98 without assistance from a person outside the boat.

Figure 6:
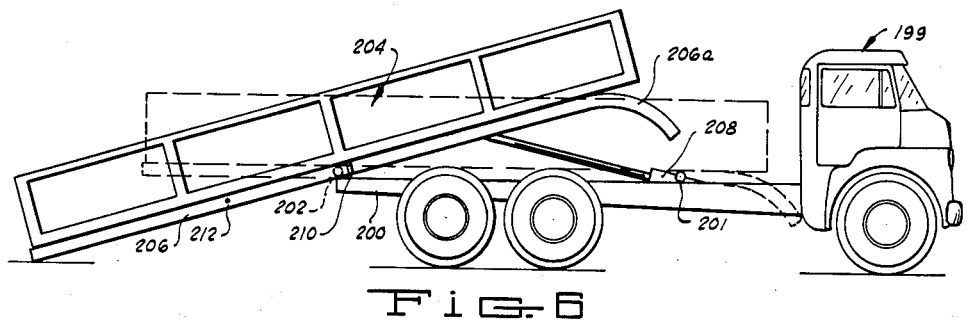
FIGURE 6 is a schematic side elevation illustrating a slightly different use and operation of a rearwardly extending and downwardly tipping load bed in accordance with the present invention.

The embodiment shown in FIG. 6 illustrates the general utility and broad versatility of the rearwardly extending and downwardly tipping load-carrying bed constructed in accordance with the present invention. A truck 199 has a chassis 200 which supports forward bearing roller means 201 and rearward bearing roller means 202. Although not shown, there will normally be two rollers 201 and two rollers 202 transversely aligned on opposite sides of a chassis and spaced longitudinally thereof. A conventional type load-carrying bed 204 may be adapted to haul grain and other farm products and also have a floor suitably adapted to transport various powered farm vehicles such, for example, as a tractor. The bed 204 has a track means comprised of a pair of rails 206 (one of which is not shown) which extend longitudinally of the load bed 204 and longitudinally of the truck chassis 200. The rails 206 have a downwardly curved portion 206a adjacent the front end thereof. The track means 206 are preferably of the same type as channels 50 and 52 previously described in connection with the boat trailer, and cooperate with the bearing rollers 201 and 202 in the same manner as channels 50 and 52 cooperate with rollers 40, 42, 44 and 46. A hydraulic ram 208 is pivotally connected to the chassis at one end and pivotally connected at the other end to the load-carrying bed 204.

The general operation of this device is the same as that of the boat trailer previously described. The hydraulic ram 208 forces the load bed 204 rearwardly with the track channels 206 riding on the bearing rollers 201 and 202. When the downwardly curved portion 206a of the channel members engages the forward rollers 201, the front of the bed 204 is raised and the rear of the bed is tipped downwardly. However, since the chassis of the truck may be higher and therefore require a greater angle of tip of the load bed 204 before the rear end of the bed engages the ground to provide a loading ramp, it may be desirable to continue the tip of the load bed after the channels 206a have disengaged the forward bearing means 201. In this case, stop means 210 are provided in the channel members. The stop means 210 are so placed as to engage the rearward bearing rollers 202 and limit the rearward travel of the load bed at the point where the forward bearing rollers 201 leave the open end of the downwardly curved portion of the channels 206a. After the stop means 210 engage the rearward bearings 202, the hydraulic ram 208 continues to tip the load bed 204 until the rear end of the bed engages the surface of the ground. Then a tractor or other vehicle can be driven onto the sloping load bed. The vehicle should be driven toward the front of the bed so that the center of gravity of the load and the bed 204 is in front of the rearward bearings 202. Then as the load bed 204 is lowered by the hydraulic ram 208, the downwardly curved portion of the channels 206a reengages the forward bearing means 201 and the load bed commences to be pulled forwardly as it is lowered until the forward transporting position shown in dotted outline is reached.

It will be noted that the embodiment shown in FIG. 6 is readily adaptable to provide, in the alternative, a dump bed for hauling grain. All that is required is that the forward bearing means 201 be disengaged from within the channel members 206 and a pin (not shown) inserted in a hole 212 in each of the channel rails 206. The pins engage the rear bearings 202 when the load bed is substantially in its forward or level transporting position. With the forward bearings 201 disengaged from the rails and rearward movement of the load bed prevented by a pin in the hole 212, the hydraulic ram immediately begins raising the front of the load bed in conventional dump bed fashion to dump the wheat or other grain which may be carried in the load bed.

From the foregoing description of the operation of the device shown generally in FIGS. 1-5 and that shown in FIG. 6, it will be apparent that a load bed of general utility which extends rearwardly and tips downwardly to facilitate loading of other vehicles has been provided. It will also be appreciated that the degree of tip of the bed is a function of both the spacing between the two sets of forward and rearward bearing means and the curvature of the track channels. Almost any desired relationship between the distance of rearward extension and degree of tip can be obtained by varying the spacing of the forward and rearward bearing means and the curvature of the front part of the channel rails.

We claim:

1. In combination with a vehicle having a chassis with front and rear ends defining the longitudinal length thereof, first and second bearing means spaced longitudinally on said chassis, load-carrying means having elongated track means extending longitudinally of said chassis and arranged to ride on said bearing means, said track means having a downwardly curved portion adjacent one end thereof, and means for moving the load-carrying means longitudinally of the chassis with said track means riding on said bearing means whereby said curved portion will cause said load-carrying means to tip as it is moved longitudinally.

2. In combination with a vehicle having a chassis with front and rear ends defining the longitudinal length thereof, first bearing means on said chassis adjacent the rear end thereof, second bearing means on said chassis spaced forward of the first bearing means, load-carrying means having elongated track means extending longitudinally of said chassis and riding on said bearing means, said track means having a downwardly curved portion adjacent the front end of the chassis, and having downwardly and upwardly facing load-bearing surfaces adjacent the front end of the chassis which alternately engage said second bearing means dependent upon the location of the center of gravity of the load-carrying means and the load carried thereby, and means for moving the load-carrying means longitudinally of said chassis with said track means engaging said bearing means whereby said load-carrying means will tip downwardly as it is moved rearwardly and return to its original position as it is moved forwardly.

3. The combination as set out in claim 2 wherein said means for moving the load-carrying means longitudinally of said chassis comprises a shuttle track extending longitudinally of said chassis, a shuttle member reciprocally moving along said shuttle track, an elongated member pivotally connected at one end to said load-carrying means and at the other end to said shuttle member, and means for moving said shuttle member along said track.

4. The combination as set out in claim 3 wherein said means for moving said shuttle member along said track comprises a flexible endless member connected at one point to said shuttle member, said flexible endless member running on an idler sprocket adjacent one end of said shuttle track and a power sprocket adjacent the other end of said shuttle track, and reversible power means driving said power sprocket whereby said shuttle means will be moved in either direction along said shuttle track.

5. In combination with a vehicle having a chassis with front and rear ends defining the longitudinal length thereof, first and second bearing means spaced longitudinally on said chassis, load-carrying means having elongated track means extending longitudinally of said chassis and arranged to ride on said bearing means as said load-carrying means it moved longitudinally of said chassis, said track means having a downwardly curved portion adjacent one end thereof, stop means for limiting the rearward movement of said load bearing means, arm means pivotally connected to said load-carrying means, and means for moving said arm means longitudinally of said chassis a greater distance than said load-carrying means is moved before said stop means stops the rearward movement thereof whereby said load-carrying means will be moved longitudinally of said chassis and will be tipped downwardly as said curved portion engages said second bearing means and will continue to be tipped downwardly as said arm means is moved rearwardly.

6. In combination with a vehicle having a chassis with front and rear ends defining the longitudinal length thereof, a rear pair of bearing members on said chassis adjacent the rear end thereof, a front pair of bearing members on said chassis spaced forward of said rear pair, a load-carrying frame having a pair of parallel channel members extending longitudinally of the chassis and adapted to ride on said bearing members, said channel members having upper and lower load bearing flanges and similar downwardly curved portions adjacent the front ends thereof, said upper and lower load bearing flanges alternately engaging said front bearing members dependent upon the location relative to the rear bearing members of the combined center of gravity of the load-carrying frame and the load carried thereby, and means for moving said load-carrying frame longitudinally of said chassis with said channel members engaging said bearing members whereby the rear end of said load-carrying frame will be tipped downwardly as it is moved rearwardly and the curved portion of said channel members engage the front pair of bearing members and the load-carrying frame will be returned to its original position as it is moved forwardly.

7. The combination as set out in claim 6 wherein said means for moving said load-carrying frame longitudinally of said chassis comprises a shuttle track on said chassis extending longitudinally thereof, a shuttle member reciprocally moving on said shuttle track, elongated means pivotally connected at one end to said load-carrying frame and at the other end to said shuttle member, and means for moving said shuttle member in both directions along said shuttle track.

8. A vehicle for transporting, launching and retrieving a boat comprising a wheeled chassis with front and rear ends defining the longitudinal length thereof, rear bearing means on said chassis adjacent the rear thereof, front bearing means on said chassis spaced forwardly of said rear bearing means, load-carrying means having elongated track means extending longitudinally of said chassis and riding on said bearing means, said track means having a downwardly curved portion adjacent the front end of the chassis, means for moving said load-carrying means longitudinally of said chassis with said track means riding on said bearing means whereby said curved portion will cause said load-carrying means to tip downwardly as it is moved rearwardly, a launching track extending longitudinally of said load-carrying means and movable therewith, cradle means traveling on said launching track, said cradle means being adapted to be releasably connected to a boat, and means for propelling said cradle means in both directions along said launching track whereby a boat connected to said cradle means can be launched from or loaded onto said load-carrying means.

9. A vehicle for transporting, launching and retrieving a boat as set out in claim 8 wherein said means for moving said load-carrying means longitudinally of said chassis comprises a shuttle track on said chassis extending longitudinally thereof, a shuttle member reciprocally traveling on said shuttle track, elongated means pivotally connected at one end to said load-carrying means and at the other end to said shuttle member, and electrically powered means for moving said shuttle member in both directions along said shuttle track.

10. A vehicle for transporting, launching and retrieving a boat as set out in claim 9 wherein said electrically powered means for moving said shuttle member in both directions along said shuttle track comprises a flexible endless member connected at one point to said shuttle member, said endless member running on an idler sprocket adjacent one end of said shuttle track and a power sprocket adjacent the other end of said shuttle track, a reversible electric motor driving said power sprockets and wherein said means for propelling said cradle means in both directions along said launching track comprises a second flexible endless member connected at one point to said cradle means, said second endless member running on a second idler sprocket adjacent one end of said launching track and on a second power sprocket adjacent the other end thereof, and a second reversible electric motor driving said second power sprocket.

11. A vehicle for transporting, launching and retrieving a boat as set out in claim 10 wherein said controls for said first and second reversible electric motors are located on a pedestal on said cradle means at a point accessible to a person within a boat connected to said cradle means.

12. A vehicle for transporting, launching and retrieving a boat comprising a wheeled chassis with front and rear ends defining the longitudinal length thereof, a rear pair of bearing members on said chassis adjacent the rear end thereof, a front pair of bearing members on said chassis spaced forward of said rear pair, a load-carrying frame having a pair of parallel channel members extending longitudinally of said chassis and adapted to ride on said bearing members, said channel members having upper and lower load bearing flanges and similar downwardly curved portions adjacent the front ends thereof, said upper and lower load bearing flanges alternately engaging said front bearing members dependent upon the location relative to the rear bearing members of the combined center of gravity of the load-carrying frame and the load carried thereby, means for moving said load-carrying frame longitudinally of said chassis with said channel members engaging said bearing members whereby as said load-carrying frame is moved rearwardly it will tip downwardly as the curved portions of said channel members engage the front bearing members and will return to its original position as it is moved forwardly, a launching track on said load-carrying frame extending longitudinally thereof, cradle means traveling on said launching track, said cradle means being adapted to be releasably connected to a boat, and means for propelling said cradle means in both directions along said launching track whereby a boat connected to said cradle means can be launched from or loaded onto said load-carrying frame.

13. A vehicle for transporting, launching and retrieving a boat comprising a wheeled chassis with front and rear ends defining the longitudinal length thereof, a rear pair of bearing members on said chassis adjacent the rear end thereof, a front pair of bearing members on said chassis spaced forward of said rear pair, a load-carrying frame having a pair of parallel channel members extending longitudinally of said chassis and adapted to ride on said bearing members, said channel members having upper and lower load bearing flanges and similar downwardly curved portions adjacent the front ends thereof, said upper and lower load bearing flanges alternately engaging said front bearing members dependent upon the location relative to the rear bearing members of the combined center of gravity of the load-carrying frame and the load carried thereby, a shuttle track on said chassis and extending longitudinally thereof, a shuttle member reciprocally traveling on said shuttle track, an elongated member pivotally connected at one end to said shuttle member and at the other end to said load-carrying frame, first electric power means for propelling said shuttle member in both directions along said shuttle track whereby said load-carrying frame will be moved longitudinally of said chassis and will tip rearwardly as it is moved rearwardly and said curved portions of said channel members engage said front bearing members and will return to substantially level position as the load-carrying frame is moved forwardly, a launching track on said load-carrying frame and extending longitudinally thereof, cradle means traveling on said launching track, said cradle means being adapted to be releasably connected to a boat, second electric power means for propelling said cradle means in both directions along said launching track whereby a boat connected to said cradle means can be launched from or loaded onto said load-carrying frame, and electric control means for said first and second electric power means on a support connected to said cradle means, said control means being presented within reach of a person within the boat being launched or retrieved.

References Cited in the file of this patent

UNITED STATES PATENTS

| | | |
|---|---|---|
| 2,466,452 | Lisota | Apr. 5, 1949 |
| 2,659,504 | Kranawetvogel | Nov. 17, 1953 |
| 2,821,315 | Bucher | Jan. 28, 1958 |
| 2,936,915 | Marsh | May 17, 1960 |
| 2,938,642 | Felix | May 31, 1960 |